United States Patent [19]
Shriver et al.

[11] 3,984,665
[45] Oct. 5, 1976

[54] PROCESS CONTROLLER

[75] Inventors: Earl E. Shriver; James E. Layton, both of Bartlesville, Okla.

[73] Assignee: Phillips Petroleum Company, Bartlesville, Okla.

[22] Filed: June 4, 1975

[21] Appl. No.: 583,726

[52] U.S. Cl. ............................ 235/151.1; 235/150.5
[51] Int. Cl.² ...................... G05B 13/00; G06F 9/06
[58] Field of Search........... 235/150.1, 151.1, 150.5, 235/150.51, 150.53, 151; 318/591

[56] References Cited
UNITED STATES PATENTS

| | | | |
|---|---|---|---|
| 3,409,251 | 11/1968 | Lawson et al. | 235/150.1 X |
| 3,648,032 | 3/1972 | Gineste | 235/151.1 X |
| 3,665,172 | 5/1972 | Spaargaren et al. | 235/150.1 |
| 3,705,978 | 12/1972 | De Schamphelaere | 235/151.1 |

*Primary Examiner*—Edward J. Wise

[57] ABSTRACT

An analog signal representative of the condition of a process variable and an analog set point signal representative of the desired value of the process variable are compared to provide an analog error signal. In response to the analog error signal the controller generates a sign signal and a pulse rate signal which can be utilized to increase or decrease the digital value stored in a counter from which a process control signal is generated. In a preferred embodiment the process controller of the invention is utilized as a backup controller for a direct digital control system and utilizes the same digital output, digital to analog conversion, and analog output components as the associated direct digital controller.

19 Claims, 6 Drawing Figures

PROCESS CONTROLLER

This invention relates to a process controller. In another aspect the invention relates to an apparatus and method for generating a digital control signal in response to an analog error signal. In yet another aspect the invention relates to a backup controller for a digital control system. In still another aspect the invention relates to an apparatus and method for backup control of a digital control system utilizing the same digital analog control output apparatus as the digital control system.

With the increasing use of digital computers to supervise and control various processes and process operations there is an increased need for nondigital equipment which, while it may be essentially analog in construction, is capable of communicating an output signal to digital equipment with which it may be associated. This is especially true in the case of a backup controller to be used in conjunction with a direct digital control system.

The primary hazard associated with the use of direct digital control for many processes is the fact that failure of any of the major central components of the control system may result in the failure of all control loops. In a conventional analog control system, on the other hand, failure of a piece of equipment will ordinarily affect no more than a few control loops, and a process operator can readily assume manual control of the affected control loops while equipment repair is being made. When a software programmed digital computer is being utilized to control an entire process, however, a failure within the computer can result in all control loops being disabled and can therefore result in a situation in which manual control of the process to continue production or even to provide an orderly shutdown of the process is extremely difficult if not impossible. For this reason, the use of digital computers to provide analog set points to what are essentially analog control systems has been more prevalent than direct digital process control, particularly in those processes where control failure will present a hazardous or potentially hazardous situation.

Accordingly, an object of the invention is to provide a process controller. Another object of the invention is to provide an apparatus and method for producing a digital control signal in response to an analog error signal. Still another object of the invention is to provide a backup controller for a direct digital control system. Yet another object of the invention is to provide an apparatus and method for delivering a digital backup control signal to the digital output means of a digital controller in response to an analog error signal. Another object of the invention is to provide a control system having both a primary digital control system and an analog backup control system compatible therewith.

In accordance with the invention a control system is provided whereby an analog process variable signal representative of the value of a process variable to be controlled and an analog set point signal representative of the desired process variable value are compared to generate an analog error signal. An analog controller means thereafter establishes a controller output. The sign of the controller output is provided to a digital counter to control the direction in which the counter will operate, and the magnitude of the controller output is converted to a series of pulses having a frequency determined by the output signal magnitude. The thus-generated pulses are then counted by the digital counter to maintain a process control signal value within the digital counter. When used as a backup controller for a direct digital controller system, the same digital counter can be used to serve both the primary digital control system and the backup controller so that the same process control system output apparatus and method will be utilized by both the primary control system and the backup controller. A backup control system utilizing the apparatus and method of the invention can be provided with a backup controller for each control loop of the system or can utilize a backup controller for only selected control loops which must be closely monitored or cannot be effectively manually controlled by a process operator.

Other objects and advantages of the invention will be apparent from the following description of the invention and the claims thereto, including a detailed description of the drawing in which:

Figure 1:
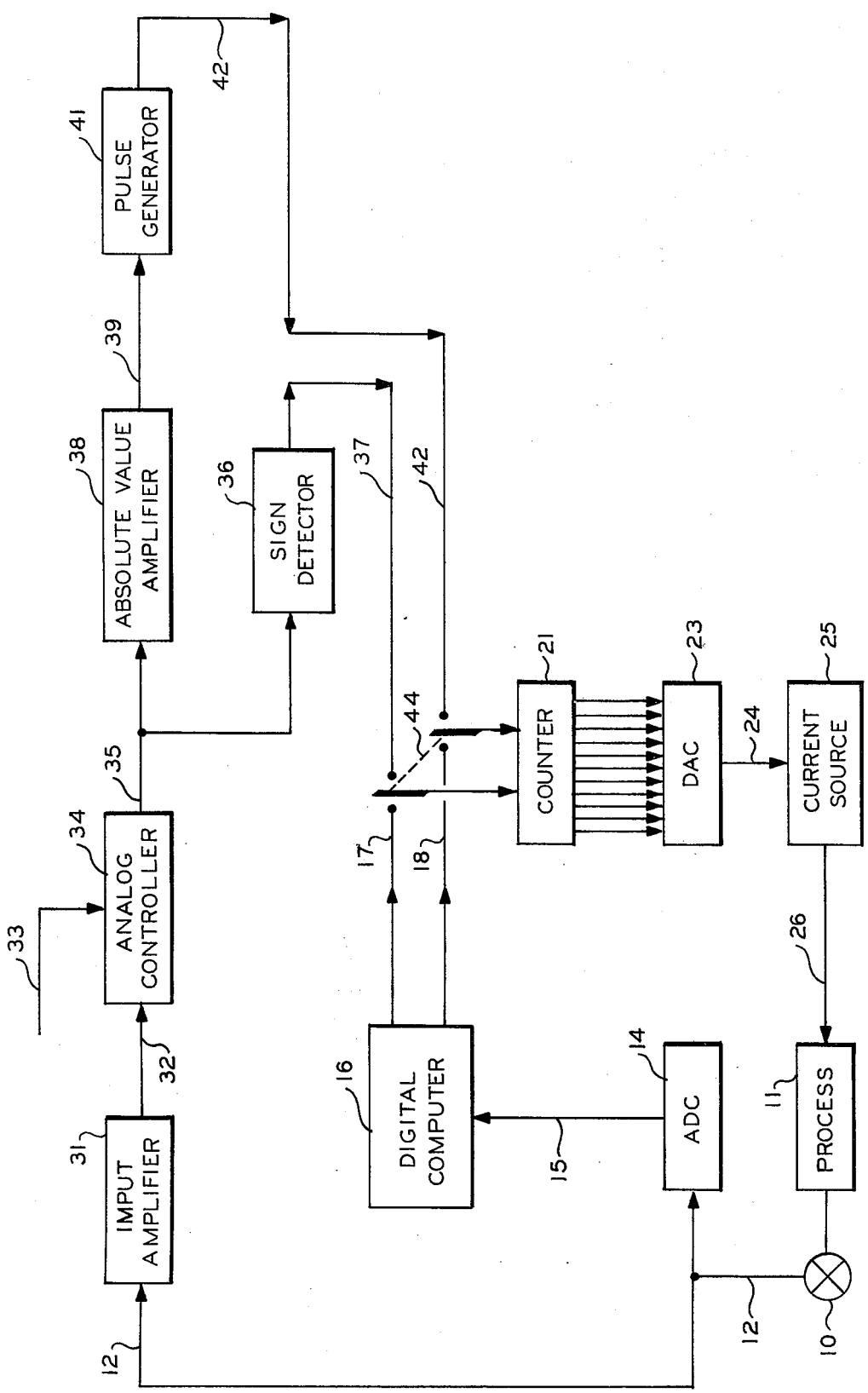
FIG. 1 is a schematic block diagram of a process control system employing a preferred apparatus and method of the invention.

Referring to FIG. 1, there is schematically illustrated a process 11 having one or more process variables which are desirably controlled in accordance with the invention. One such process variable is measured by a process variable transducer 10 or other suitable means known in the art to produce an analog process variable signal 12 representative of the value of the process variable to be controlled. When direct digital control of the process variable is desired, an analog to digital converter (ADC) 14 converts the process variable signal 12 to a digital process variable signal 15 which can be utilized as an input to a programmed digital computer 16. In response to the software program implementing the direct digital control of the process 11, the digital computer 16 produces a sign output 17 and a pulse output signal 18 which can be utilized by a digital counter 21 to maintain a stored digital count or value as the output of the digital computer 16. A digital to analog converter (DAC) 23 is then utilized to convert the value represented by the content of the counter 21 to an analog output signal 24. The analog output signal 24 is accepted by a current source means 25 which produces an analog current control signal 26 in response thereto. The analog output current signal 26 is then utilized as a control signal to adjust operation of the process 11 so that the process variable represented by the process variable signal 12 will be maintained at a desired value. Although the control signal 26 can be used to directly alter the process variable measured by the transducer 10, a change in process conditions will ordinarily be initiated by the control signal 26, with response by the measured process variable being dependent on the dynamic conditions and characteristics of the process.

While only one process variable 12 has been illustrated in conjunction with control of the process 11 shown by FIG. 1, most direct digital control systems utilizing a digital computer 16 in the manner illustrated will utilize the digital computer 16 to control several process variables utilizing a plurality of separate control loops since the speed of software implemented control systems makes possible nearly simultaneous control of a large number of control loops to produce various control signals 26 to control numerous process variables. With backup control of a direct digital control loop such as the one illustrated in FIG. 1 wherein the process variable signal 12 is maintained at a desired value or within a desired range by generation of a control signal 26, input signals to the counter 21 can be generated in accordance with the apparatus and method of the present invention.

Figure 2:
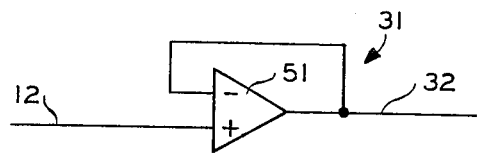
FIG. 2 is a detailed electrical schematic diagram of a preferred input amplifier for use with the invention.

The analog process variable signal 12 is supplied to an input amplifier means 31 which produces a process variable analog controller input signal 32 in response thereto. Although the input amplifier 31 can impart a desired scaling factor to the process variable signal 12, scaling of the process variable signal 12 is preferably accomplished in conjunction with the choice and adjustment of the apparatus which produces the process variable signal 12 within the process 11, and the input amplifier 31 is used primarily to provide a unity gain, high impedance input signal to the backup controller which will result in an analog control input signal 32 of the same electrical value as the process variable signal 12 without draining or otherwise disturbing the source of the process variable signal 12. While any suitable input means can be employed, a preferred input amplifier 31 is illustrated by FIG. 2.

Figure 3:
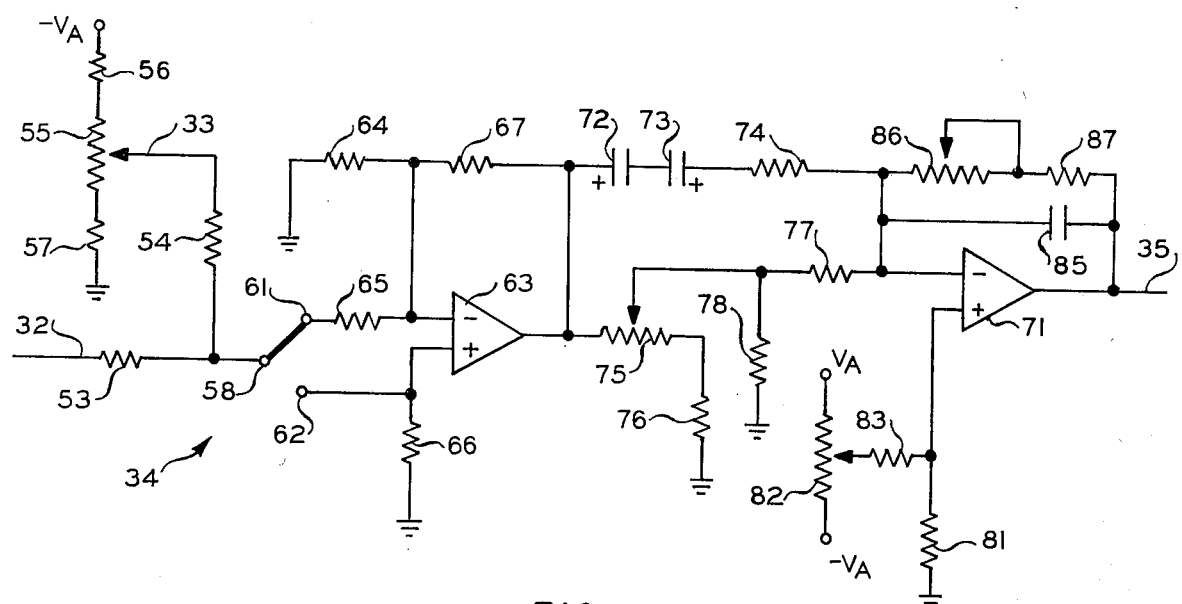
FIG. 3 is a detailed electrical schematic diagram of a preferred analog controller for use with the invention.

The analog controller input signal 32 and an analog process variable set point signal 33 are accepted by an analog controller means 34 which produces an analog control signal 35 in response to the difference between the analog controller input signal 32 and the set point signal 33. Although the characteristics of the analog controller 34 can be chosen to fit the needs of each particular application, a preferred analog controller which can be advantageously used with a pulse generator 41 and counter 21 which together perform an inherent integrating function is any suitable proportional, derivative or combination of proportional and derivative, such as proportional-first derivative, proportional-first derivative-second derivative, or other similar controller having an output bearing a proportional or derivative relationship, or both, to the input thereto. Use of a controller 34 having any substantial integral action is preferably avoided when a subsequent integration will be performed by the pulse generator and counter. A particularly preferred analog controller 34 is one which produces a proportional-derivative output signal 35 having the general form:

$$K_1 E + K_2 \frac{dE}{dt}$$

where $K_1$ and $K_2$ are constants, and E is the difference between the analog control input signal 32 and the set point signal 33. A preferred analog controller of this type is illustrated by FIG. 3.

Figure 4:
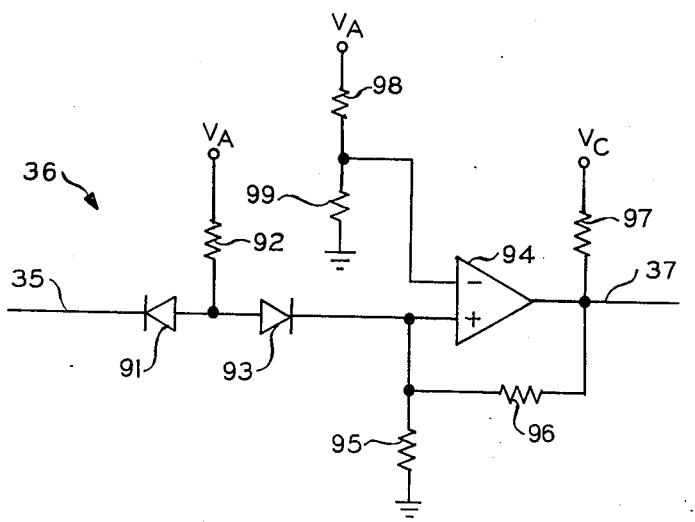
FIG. 4 is a detailed electrical schematic diagram of a preferred analog sign detector for use with the invention.

A sign detector means 36 utilizes the output signal 35 from the analog controller 34 as an input and delivers an output signal 37 indicative of the sign of the analog controller output signal 35. The characteristics of the sign detector means 36 are such that when the analog controller output signal 35 is positive the sign detector output signal 37 will be an appropriate voltage representative of a first digital logic state. Likewise, when the sign of the analog controller output signal 35 is negative, the sign detector output signal 37 will be a second voltage value recognizable as a second digital logic state. Depending upon the nature of the logic involved and the requirements of the counter 21, a positive analog controller output signal 35 will result in the sign detector output signal 37 being either a logic "zero" or a logic "one" with a negative analog controller output signal 35 resulting in the opposite logic state being delivered as the sign detector output signal 37. Although any suitable sign detector means can be utilized, a preferred sign detector means 36 is illustrated by FIG. 4.

Figure 5:
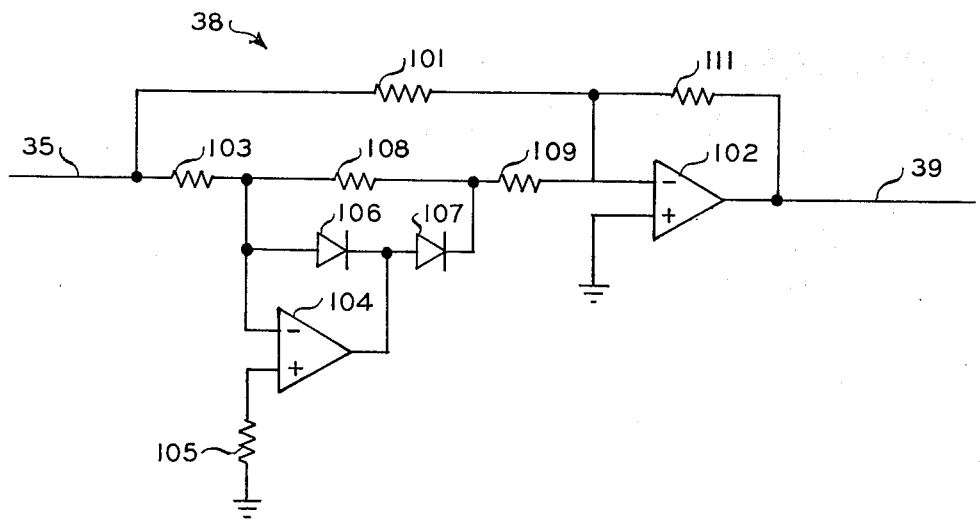
FIG. 5 is a detailed electrical schematic diagram of a preferred absolute value amplifier for use with the invention.

The analog controller output signal 35 is also utilized as an input signal to an absolute value amplifier means 38 which produces an output signal 39 bearing a predetermined proportional relationship to the magnitude of the analog controller output signal 35 without regard for the sign of the analog controller output signal 35. A positive analog controller output signal 35 and a negative signal 35 of the same magnitude will therefore result in the same absolute value output signal 39 being delivered by the output value amplifier means 38. Any suitable absolute value amplifying means can be utilized, and a presently preferred absolute value amplifier 38 is illustrated by FIG. 5.

Figure 6:
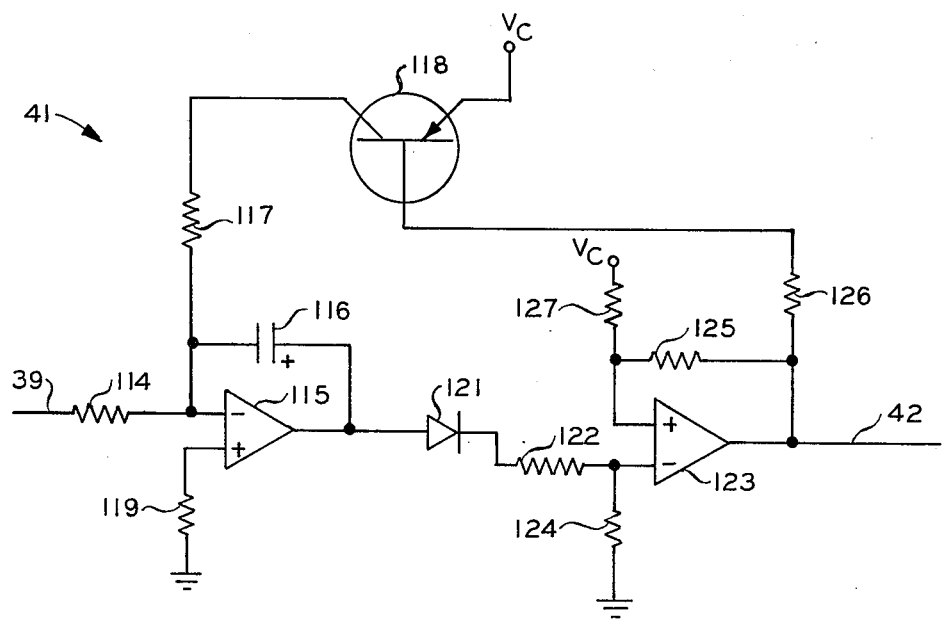
FIG. 6 is a detailed electrical schematic diagram of a preferred voltage to pulse rate converter for use with the invention.

A pulse generator means 41 is utilized to generate a pulse output signal 42 in response to the absolute value output signal 39. The nature of the pulse generator means 41 is preferably such that the rate at which pulses which can be counted by the counter 21 are delivered therefrom is generally proportional to the absolute value output signal 39. Although any suitable pulse generating means can be employed in the invention, a preferred pulse generating means 41 is illustrated by FIG. 6.

A switch means 44 is utilized to select between the sign and pulse signals 17 and 18 from the digital computer 16 and the sign and pulse signals 37 and 42 from the backup system as inputs to the counter 21. In this manner, the analog backup controller can utilize the counter 21, digital to analog converter 23, and current source 25 to communicate a control signal 26 to the process 11. Although the switch means 44 can be a manual switch which a process operator can use to select between direct digital control and backup analog control, the switch means 44 could also be a solid state digital switch, data gate or other similar means susceptible to automatic control in response to an alarm signal or watchdog subroutine within the digital computer 16. Whether the counter 21 receives its inputs from the digital computer 16 or from the sign detector 36 and pulse generator 41, the respective sign signal 17 or 37 determines whether the counter 21 will count up or down and the respective pulse signal 18 or 42 will advance the counter 21 in the specified direction each time the pulse is received. Advancing the counter 21 in a direction specified by the sign of the analog controller output signal 35 and by an amount proportional to the magnitude of the analog controller output signal 35 will effectively result in the integration of the analog controller output signal 35 by the counter 21 so that the output of the counter 21, when a proportional-integral controller 34 is used, will be of the general form:

$$\int K_1 E \, dt + \int K_2 \frac{dE}{dt} dt, \text{ or } \int K_1 E \, dt + \int K_2 dE$$

where $K_1$, $K_2$, and $E$ are as previously defined. The overall effect of the input amplifier 31, analog controller 34, sign detector 36, absolute value amplifier 38, pulse generator 41, and counter 21 is to produce a proportional-integral control output even though the output of the analog controller 34 is generally proportional-derivative in form. In a similar manner, a proportional-first derivative-second derivative controller 34 can be used to obtain an overall proportional-integral-derivative control signal from the counter 21. The time responses of the controller 34 and pulse generator 41 must, of course, be compatible with each other and with the dynamic characteristics of the process 11.

Overall operation of the apparatus and method illustrated by FIG. 1 as a backup controller for a direct digital control system is preferably such that a large analog controller output signal 35 produces a fast pulse rate as the output of the pulse generator 41, thus rapidly counting the counter 21 up or down, depending on the sign of the analog controller output signal 35. As the signal 35 decreases, the pulse rate slows and essentially stops when the error ($E$), and thus the signal 35, approaches zero.

The preferred input amplifier 31 illustrated by FIG. 2 comprises an analog operational amplifier 51 having an inverting input and a noninverting input. The analog process variable signal 12 from the process 11 is supplied to the noninverting input of the amplifier 51 with the analog control input signal 32 being produced as the output of the amplifier 51 and being utilized as a feedback signal to the inverting input of the amplifier 51. This preferred input amplifier configuration provides a voltage follower or buffer amplifier having unity gain. The preferred circuit provides high input impedance to signals, allowing use of inputs from high output impedance devices.

In the preferred analog controller 34 illustrated by FIG. 3 the analog controller input signal 32 is applied to a resistor 53. The value of the set point signal 33 is determined by adjustment of a potentiometer 55 located within a series combination of a resistor 56, the potentiometer 55, and a resistor 57 between a suitable voltage source $-V_A$ and ground. The set point signal 33 is applied to a resistor 54 equal in value to the resistor 53 with the ends of resistor 53 and 54 opposite the point at which the signals 32 and 33 are applied being connected to an error input terminal 58. The error input terminal 58 can be connected by a switch or by a permanently wired connection to either an inverting input terminal 61 or a noninverting input terminal 62 associated with an error amplifier 63. The values of a resistor 64 connected between the inverting input of the amplifier 63 and ground, a resistor 65 connected between the inverting input terminal 61 and the inverting input of the amplifier 63, a resistor 66 connected between the noninverting input terminal 62 or noninverting input of the amplifier 63 and ground and the feedback resistor 67 connected between the output and the inverting input of the amplifier 63 are preferably selected to provide, in addition to the desired amount of amplifier gain, a uniform amplifier gain with only a change in sign of the amplifier output when the error input terminal 58 is connected to either the inverting input terminal 61 or the noninverting input terminal 62.

The output of the error amplifier 63 is connected to the inverting input of a control amplifier 71 by a resistive-capacitive combination comprising a series combination of a capacitor 72, a capacitor 73, and a resistor 74. A potentiometer 75 is connected at one end to the output of the error amplifier 63 and at the other end to a resistor 76 which is in turn connected to ground. The sliding contact of the potentiometer 75 is connected through a resistor 77 to the inverting input of the controller amplifier 71 and through a resistor 78 to ground. The output of the error amplifier 63 is therefore conveyed to the inverting input of the controller amplifier 71 by the series combination of the capacitors 72 and 73 with the resistor 74, all in parallel with the equivalent resistance of the resistors 75, 76, 77, and 78. Since the output of the error amplifier 63 may be either positive or negative the capacitor combination of capacitors 72 and 73 must be nonpolar. This effect can be achieved by connecting two polar capacitors in series as illustrated. The resistors 76 and 78 preferably provide for a reduced signal strength by a factor of about 10 when the potentiometer 75 is at the low end of its travel. The potentiometer 75 is utilized to adjust the proportional gain of the controller amplifier 71 which has the equivalent effect of adjusting the overall integral response of the backup controller. Different values may be utilized for the resistor 77 in order to provide large scale changes in the integral action of the overall control system.

The noninverting input of the amplifier 71 is connected to ground by a resistor 81 and to the movable contact of a potentiometer 82 by a resistor 83. The ends of the potentiometer 82 are connected between voltage sources $V_A$ and $-V_A$. The combination of the potentiometer 82 and resistors 81 and 83 connected in this manner provides a nulling device by which compensation for small voltage differences in the remainder of the circuitry associated with the controller amplifier 71 can be provided. A capacitor 85 is connected between the output of the amplifier 71 and the inverting input thereof to provide a time lag which will tend to reduce transient effects and eliminate noise from the analog controller output signal 35. A potentiometer 86 in series with a resistor 87 are also connected between the output of the controller amplifier 71 and the inverting input thereof. By adjusting the potentiometer 86 the overall gain of the controller is determined. The characteristics of the controller 34 are preferably such that the relatively small changes commonly occurring in the process variable signal 12 will be responded to accurately. As a consequence of this sensitivity a step increase in the error signal caused by a set point change, for example, may saturate the amplifier 71 for a period of time. This saturation is not detrimental to the operation of the control system and is, in fact, useful since it provides pulse generation at the maximum rate of the pulse generator 41 and thereby provides the overall backup system control with the fastest possible proportional response to an abrupt error signal change.

The sign detector circuit 36 illustrated by FIG. 4 accepts the analog controller output signal 35 as an input thereto. This input signal is applied to the cathode of a diode 91. The anode of the diode 91 is connected by a resistor 92 to a positive voltage source $V_A$. The anode of the diode 91 is also connected to the anode of a diode 93. The cathode of the diode 93 is connected to the noninverting input of an amplifier 94 which is connected as a comparator. The noninverting input of the amplifier 94 is connected to ground through a resistor 95 and is connected to the output terminal of the amplifier 94 through a resistor 96. The output of the amplifier 94 is also connected through a resistor 97 to a voltage source $V_C$, a positive voltage source, of lower potential than $V_A$, equivalent to a logic "one" for the digital equipment to be employed in interpreting the logic state of the sign detector output signal 37. The inverting input of the amplifier 94 is maintained at a small positive voltage near zero by a voltage divider arrangement of a resistor 98 and a much smaller resistor 99 connected between the positive voltage source $V_A$ and ground. When the analog controller output signal 35 is negative, the voltage at the anodes of the diodes 91 and 93 will be a small positive voltage determined by the small inherent resistance of the diode 91 in its conducting state and by whatever small resistance to flow may be present in the output circuit of the analog controller 34. Under these circumstances current will flow through the resistor 92 into the controller amplifier 71 (FIG. 3), the diode 93 will be in its nonconducting state, and the voltage applied to the noninverting input of the comparator amplifier 94 will not be sufficient to overcome the limit established by the voltage divider of the resistors 98 and 99. This will cause the output of the comparator amplifier 94 to remain at a grounded or logical "zero" value. When the analog controller output signal 35 is positive, the anodes of the diodes 91 and 93 will be a potential higher than the potential needed by the diode 93 to be conductive, and a positive voltage higher than the threshold voltage established by the resistors 98 and 99 will be present at the noninverting input of the comparator amplifier 94. This condition will cause the output of the amplifier 94 to switch to a positive voltage determined by the value of the voltage $V_C$. The specific characteristics of the diodes 91 and 93 as well as the relative values of the resistors 98 and 99 can be chosen so that the change in logic state of the output signal 37 takes place at the same time that the input signal 35 changes from a positive to a negative or from a negative to a positive value. Utilizing the circuit illustrated, a positive analog controller output signal 35 will result in a logic "one" sign detector output signal 37 and a negative analog controller output signal 35 will result in a logic "zero" sign detector output signal 37. Depending on the particular characteristics of the counter 21 to be employed in the control system, a suitable binary logic inverter can be applied to the sign detector output signal 37 to provide counting by the counter 21 in the appropriate direction responsive to the sign of the analog controller output signal 35.

The absolute value amplifier 38 illustrated by FIG. 5 is a precision rectifier circuit which accepts the analog controller output signal 35 as an input and delivers an output signal 39 which is always negative and is of the same magnitude as the analog controller output signal 35. A resistor 101 connects the analog control output signal 35 to the inverting input of an amplifier 102, and is connected by a resistor 103 to the inverting input of an amplifier 104. The noninverting input of the amplifier 102 is connected to ground and the noninverting input of the amplifier 104 is connected through a resistor 105 to ground. The output of the amplifier 104 is connected to the cathode of a diode 106 and to the anode of a diode 107. The anode of the diode 106 is connected to the inverting input of the amplifier 104, and the cathode of the diode 107 is connected through a resistor 108 to the inverting input of the amplifier 104. The cathode of the diode 107 is also connected through a resistor 109 to the inverting input of the amplifier 102. The output of the amplifier 102 is connected through a resistor 111 to the inverting input thereof. The resistors 101, 103, 108, and 111 are preferably of the same value, with the resistor 109 having a resistance which is one-half that of resistors 101, 103, 108, and 111. Such resistance values will result in the absolute value amplifier 38 having the desired operational characteristics.

In operation, when the analog controller output signal 35 is positive the attempt of the amplifier 104 to produce a negative output signal will result in the diode 106 being an effective short circuit and the diode 107 being an effective open circuit. With a resistance of substantially zero in the negative feedback circuit of the amplifier 104, the negative input of the amplifier 104 will be maintained at substantially zero potential thereby applying a zero potential signal through resistors 108 and 109 to the inverting input of the amplifier 102. At the same time the positive analog controller output signal 35 is applied through the resistor 101 to the inverting input of the amplifier 102. The effect of the amplifier 102 is to add the signals received through resistors 101 and 109, according the signal received through resistor 109 twice as much weight as the signal received through resistor 101 due to the fact that the resistance of the resistor 109 is only half that of the resistor 101. Since the voltage applied through the inverting input of the amplifier 102 through the resistor 109 in this case is zero, however, the effect of the amplifier 102 is to invert the signal applied through the resistor 101 without affecting its magnitude since resistors 101 and 111 are of the same value. The effect of applying a positive analog controller output signal 35 to the absolute value amplifier 38 is therefore to generate an absolute value amplifier output signal 39 which is of equal magnitude and opposite sign as the input signal 35.

When the analog controller output signal 35 is negative, the production of a positive signal as the output of the amplifier 104 results in the diode 106 being an effective open circuit and the diode 107 being an effective short circuit thereby resulting in a voltage at the cathode of the diode 107 which is of opposite sign from the input signal 35 and, due to the resistors 103 and 108 being of the same value, of equal magnitude to the input signal 35. This results in a positive voltage of equal magnitude to the negative analog controller output 35 being applied through the resistor 109 to the inverting input of the amplifier 102. At the same time the negative analog controller output signal 35 is applied through the resistor 101 to the inverting input of the amplifier 102. Since the resistor 109 is only half the value of the resistor 101, the signal applied to the input of the amplifier 102 through the resistor 109 is accorded twice the weight of the signal applied through the resistor 101 and the relative values of the resistors 101, 109, and 111 along with the sign inversion accomplished by the amplifier 102 will result in the amplifier output signal 39 being on the same magnitude and sign as the analog controller output signal 35.

The circuit for the pulse generator 41 illustrated by FIG. 6 utilizes the absolute value amplifier output signal 39 as an input in the generation of a pulse output signal 42. The signal 39 is applied through a resistor 114 to the inverting input of an amplifier 115. The inverting input of the amplifier 115 is also connected through a capacitor 116 to the output of the amplifier 115 and is connected through a resistor 117 to the collector of a PNP transistor 118. The noninverting input of the amplifier 115 is connected through a resistor 119 to ground. The output of the amplifier 115 is also connected to the anode of a diode 121. The cathode of the diode 121 is connected through a resistor 122 to the inverting input of an amplifier 123. The inverting input of the amplifier 123 is also connected to ground through a resistor 124. The output of the amplifier 123, which is used as the pulse generator output signal 42, is connected to the noninverting input of the amplifier 123 through a resistor 125 and to the base of the transistor 118 through a resistor 126. The noninverting input of the amplifier 123 is also connected through a resistor 127 to a voltage source $V_C$ and the emitter of the transistor 118 is connected to the voltage source $V_C$. The $V_C$ voltage source utilized as illustrated is a voltage which will be recognizable by the digital electronic equipment such as the counter 21 as a specific logic state such as a logic "one". Resistors 125 and 127 are preferably of the same size, and the resistor 117 is preferably much smaller than the resistor 114.

The operation of the pulse generator 41 illustrated can be understood by assuming an initial condition in which the capacitor 116 is discharged and the output of the amplifier 123 is at the positive voltage $V_C$. In this condition the transistor 118 will be in a switched-off condition and the noninverting input of the amplifier 123 will be maintained at $V_C$. The application of a negative input voltage signal 39 from the absolute value amplifier 38 will cause the output of the amplifier 115 to increase at a rate generally proportional to the voltage of the signal 39 as the capacitor 116 charges. This increase in positive voltage output of the amplifier 115 will continue until the potential at the inverting input of the comparator amplifier 123 exceeds $V_C$ thereby causing the output of the amplifier 123 to become zero which in turn switches the transistor 118 on, causing the amplifier 115 to integrate in the opposite direction at a much faster rate due to the relative size difference between the resistors 117 and 114. The integrator continues in the negative direction until the inverting input of the amplifier 123 goes below a positive voltage determined by the voltage divider effect of resistors 127 and 125 (½ $V_C$ when resistors 125 and 127 are of equal value) at which time the output of the comparator amplifier 123 is returned to its $V_C$ value switching the transistor 118 back to an off position. When used in conjunction with a digital system in which the voltage $V_C$ is a logic "one" and ground is a logic "zero" the output of the amplifier 123 can be used to deliver a series of pulses which can be counted by the counter 21. Operation of the pulse generator 41 will continue as described with the magnitude of the signal 39 affecting the rate at which the capacitor 116 will charge to a value of $V_C$ thereby also affecting the rate at which pulses will be delivered by the pulse signal 42.

In addition to its usefulness as a backup controller for a direct digital controller system, a system comprising the circuits illustrated by FIGS. 2–6 can be utilized as a control system in the absence of an additional primary control system. The system is particularly useful as a backup control system for a digital computer, however, since it is capable of utilizing the same counter and output circuitry as the associated direct digital control system. Specific components which can be utilized in constructing the apparatus of the invention are as follows:

| | |
|---|---|
| ADC 14 | Analogic model MP 2814 |
| Computer 16 | Interdata model 70 |
| Counter 21 | two RCA CMOS 4029 4 bit counters |
| DAC 23 | Precision Monolithic Model DAC-100 |
| Current source 25 | Analog output circuit disclosed by U.S. Pat. 3,644,752 |
| Amplifiers 51,63,71,102,104,115 | Texas Instruments model 72558 |
| Amplifiers 94, 123 | Motorola model MC 3302 |
| Diodes 91,93,106,107,121 | 1N914 |
| Transistor 118 | 2N3906 |
| Capacitors 72, 73 | 220 mfd |
| Capacitor 85 | 10 mfd |
| Capacitor 116 | 2.2 mfd |
| Resistors 53,54,64,66,81,87,92,95, 97,99,101,103,105,108,111, 119,124,125,126,127 | 10K |
| Resistor 56 | 4.7K |
| Resistor 57 | 470 ohms |
| Resistor 65 | 8.25K |
| Resistor 67 | 75K |
| Resistor 74 | 1K |
| Resistor 76 | 39K |
| Resistor 77 | 56K |
| Resistor 78 | 15K |
| Resistor 83 | 4.7M |
| Resistor 96 | 270K |
| Resistor 98 | 680K |
| Resistor 109 | 5K |
| Resistor 114 | 120K |
| Resistor 117 | 330 ohms |
| Resistor 122 | 6.8K |
| Potentiometer 55 | 2K |
| Potentiometers 75,82 | 100K |
| Potentiometer 86 | 1M |

Utilizing the above-identified components with $V_A=+15V, -V_A=-15V$, and $V_C=+5V$, the characteristics of the various circuits of the invention will be as follows:

| | | |
|---|---|---|
| amplifier 63 gain | - | 2.8 for either input terminal |
| overall integral response (with resistor 77 = 560K, | - | 0.1 to 1 minute per reset integral 1 to 10 minutes per reset integral) |
| overall gain (adjusted by potentiometer 86) | - | 0.05 to 4 output percentage per input percentage |

Although the invention has been described herein in conjunction with the preferred embodiment thereof, it is understood that those skilled in the art will be capable of adapting the method and apparatus of the invention to provide for a wide range of signal voltage levels, sign conventions or logic state conventions, system response rates, and similar variations. These and other reasonable variations and modifications of the apparatus and method of the invention are considered to be within the scope of the foregoing disclosure of the invention and the appended claims thereto.

We claim:
1. Apparatus comprising:
   analog controller means for receiving a process variable input signal and a set point signal, comparing said process variable input signal and said set point signal to produce an error signal, and delivering in response to said error signal an analog controller output signal having a relationship to said error signal which is one of proportional, derivative, or a combination of proportional and derivative;
   sign detector means for receiving said analog controller output signal and generating in response thereto a sign output signal, said sign output signal comprising a first digital logic state when said analog controller output signal is positive and a second digital logic state when said analog controller output signal is negative;
   absolute value determination means for receiving said analog controller output signal and generating in response thereto an absolute value signal having a magnitude proportional to the magnitude of said analog controller output signal and a fixed polarity which is unchanged by a change in the polarity of said analog controller output signal; and
   pulse generating means for generating digital logic pulses at a rate determined by said absolute value signal.

2. Apparatus in accordance with claim 1 additionally comprising a digital counting means and means for adjusting the digital content of said digital counting means, in a direction designated by said sign output signal, in response to each digital logic pulse generated by said pulse generating means.

3. Apparatus in accordance with claim 2 additionally comprising:
   digital-to-analog converter means for generating an analog control signal representative of the digital content of said digital counting means; and
   means for delivering said analog control signal to a process.

4. Apparatus in accordance with claim 3 additionally comprising:
   analog-to-digital converter means for receiving said process variable input signal and delivering in response thereto a digital process signal representative thereof;
   digital computer means for receiving said digital process signal and delivering in response thereto a computer sign signal and a computer pulse signal; and
   means for selecting between computer outputs comprising said computer sign signal and said computer pulse signal and backup outputs comprising said sign output signal and said digital logic pulses as inputs to said digital counting means.

5. Apparatus in accordance with claim 1 wherein said pulse generating means comprises:
   integrating amplifier means for integrating said analog controller output signal;
   comparator amplifier means for comparing the output of said integrating amplifier means to a digital logic voltage; and
   means for resetting the output of said integrating amplifier in response to observation by said comparator amplifier of an integrating amplifier output in excess of said digital logic voltage.

6. Apparatus in accordance with claim 5 wherein said analog controller means comprises means for producing an analog controller output signal of the general form:

$$K_1 E + K_2 \frac{dE}{dt}$$

where
   $K_1$ and $K_2$ are constants, and
   $E$ = said error signal.

7. Apparatus in accordance with claim 5 additionally comprising a digital counting means and means for adjusting the digital content of said digital counting means, in a direction designated by said sign output signal, in response to each digital logic pulse generated by said pulse generating means.

8. Apparatus in accordance with claim 7 additionally comprising:
   digital-to-analog converter means for generating an analog control signal representative of the digital content of said digital counting means; and
   means for delivering said analog control signal to a process.

9. Apparatus in accordance with claim 8 additionally comprising:
   analog-to-digital converter means for receiving said process variable input signal and delivering in response thereto a digital process signal representative thereof;
   digital computer means for receiving said digital process signal and delivering in response thereto a computer sign signal and a computer pulse signal; and
   means for selecting between computer outputs comprising said computer sign signal and said computer pulse signal and backup outputs comprising said sign output signal and said digital logic pulses as inputs to said digital counting means.

10. A method comprising:

generating an analog process variable signal representative of a condition within a process to be controlled;

comparing said proces variable signal to a set point signal and generating an analog error signal in response to the comparison;

generating, from said error signal, an analog controller output signal having a relationship to said error signal which is one of proportional, derivative, or a combination of proportional and derivative;

establishing a direction signal indicative of the arithmetic sign of said analog controller output signal; and generating a pulse output signal comprising digital logic pulses appearing at a rate determined by the magnitude of said analog controller output signal.

11. A method in accordance with claim 10 additionally comprising adjusting the content of a digital counting means, by counting in a direction specified by said direction signal, in response to each logic pulse of said pulse output signal.

12. A method in accordance with claim 11 additionally comprising:

converting the content of said digital counting means to an analog process control signal; and controlling said process in response to said analog process control signal.

13. A method in accordance with claim 10 additionally comprising:

generating a computer pulse signal and a computer sign signal in response to said process variable signal by means of a programmed digital computer;

selecting between computer signals comprising said computer pulse signal and said computer sign signal and backup signals comprising said direction signal and said pulse output signal as inputs to a digital counting means;

adjusting the content of said digital counting means by counting in response to the thus-selected signals;

converting the content of said digital counting means to an analog process control signal; and controlling said process in response to said analog process control signal.

14. A method in accordance with claim 10 wherein generating said pulse output signal comprises:

rectifying said analog controller output signal;

integrating said rectified analog controller output signal until the output of the integrating means performing said integration reaches a predetermined maximum value;

resetting said integrating means to a preselected initial value;

generating a first logic state pulse output signal during the time that said integrating step is taking place; and generating a second logic state pulse output signal during said resetting of said integrating means.

15. A method in accordance with claim 14 wherein said analog controller output signal is of the general form:

$$K_1 E + K_2 \frac{dE}{dt}$$

where $K_1$ and $K_2$ are constants, and $E =$ said error signal.

16. A method in accordance with claim 14 wherein resetting said integrating means comprises biasing a transistor switch to provide a reset input, of opposite polarity from said rectified analog controller input signal, to the input of said integrating means.

17. A method in accordance with claim 16 additionally comprising adjusting the content of a digital counting means, by counting in a direction specified by said direction signal, in response to each logic pulse of said pulse output signal.

18. A method in accordance with claim 17 additionally comprising:

converting the content of said digital counting means to an analog process control signal; and controlling said process in response to said analog process control signal.

19. A method in accordance with claim 16 additionally comprising:

generating a computer pulse signal and a computer sign signal in response to said process variable signal by means of a programmed digital computer;

selecting between said computer pulse signal and computer sign signal and said direction signal and pulse output signal as inputs to a digital counting means;

augmenting the content of said digital counting means by counting in response to the thus-selected signals;

converting the content of said digital counting means to an analog process control signal; and controlling said process in response to said analog process control signal.

* * * * *

UNITED STATES PATENT AND TRADEMARK OFFICE
CERTIFICATE OF CORRECTION

PATENT NO. : 3,984,665
DATED : October 5, 1976
INVENTOR(S) : Earl E. Shriver; James E. Layton It is certified that error appears in the above-identified patent and that said Letters Patent are hereby corrected as shown below:

Column 14, claim 19, line 44, "augmenting" should be --- adjusting ---.

Signed and Sealed this

Twelfth Day of April 1977

[SEAL]

Attest:

RUTH C. MASON
Attesting Officer

C. MARSHALL DANN
Commissioner of Patents and Trademarks